United States Patent
Ergen et al.

(10) Patent No.: US 12,021,201 B2
(45) Date of Patent: *Jun. 25, 2024

(54) HIGH TEMPERATURE LI-ION BATTERY CELLS UTILIZING BORON NITRIDE AEROGELS AND BORON NITRIDE NANOTUBES

(71) Applicant: THE REGENTS OF THE UNIVERSITY OF CALIFORNIA, Oakland, CA (US)

(72) Inventors: Onur Ergen, Berkeley, CA (US); Alexander K. Zettl, Kensington, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,488

(22) Filed: Jan. 11, 2022

(65) Prior Publication Data

US 2022/0209310 A1 Jun. 30, 2022

Related U.S. Application Data

(63) Continuation of application No. 16/869,333, filed on May 7, 2020, now Pat. No. 11,223,071, which is a continuation of application No. 15/822,563, filed on Nov. 27, 2017, now Pat. No. 10,686,227.

(60) Provisional application No. 62/428,874, filed on Dec. 1, 2016.

(51) Int. Cl.
*H01M 10/42* (2006.01)
*H01M 10/0525* (2010.01)
*H01M 10/056* (2010.01)

(52) U.S. Cl.
CPC ... *H01M 10/4235* (2013.01); *H01M 10/0525* (2013.01); *H01M 10/056* (2013.01); *H01M 2300/0025* (2013.01); *H01M 2300/0045* (2013.01); *H01M 2300/0071* (2013.01); *H01M 2300/0085* (2013.01); *H01M 2300/0091* (2013.01)

(58) Field of Classification Search
CPC ......... H01M 10/4235; H01M 10/0525; H01M 10/056; H01M 2300/0025; H01M 2300/0071; H01M 2300/0082; H01M 2300/0085; H01M 2300/0088; H01M 2300/0091
See application file for complete search history.

(56) References Cited

U.S. PATENT DOCUMENTS

| | | | | | |
|---|---|---|---|---|---|
| 2004/0200991 | A1* | 10/2004 | Chu | ...... | B82Y 30/00 423/610 |
| 2018/0115014 | A1* | 4/2018 | Zanotti | ...... | H01M 10/052 |
| 2018/0166759 | A1* | 6/2018 | Zhamu | ...... | H01M 10/056 |

FOREIGN PATENT DOCUMENTS

| | | | | |
|---|---|---|---|---|
| DE | 102017217039 A1 * | 3/2019 | | |
| WO | WO-2016100715 A1 * | 6/2016 | ...... | B82Y 30/00 |

(Continued)

*Primary Examiner* — Basia A Ridley
*Assistant Examiner* — Heng M. Chan
(74) *Attorney, Agent, or Firm* — Womble Bond Dickinson (US) LLP

(57) ABSTRACT

This disclosure provides systems, methods, and apparatus related to Li-ion batteries. In one aspect an electrolyte structure for use in a battery comprises an electrolyte and an interconnected boron nitride structure disposed in the electrolyte.

18 Claims, 9 Drawing Sheets

(56) References Cited

FOREIGN PATENT DOCUMENTS

| WO | WO-2016151142 A1 | * | 9/2016 | ......... B01D 67/0079 |
| WO | WO-2017136574 A1 | * | 8/2017 | ............... C08K 3/22 |

* cited by examiner

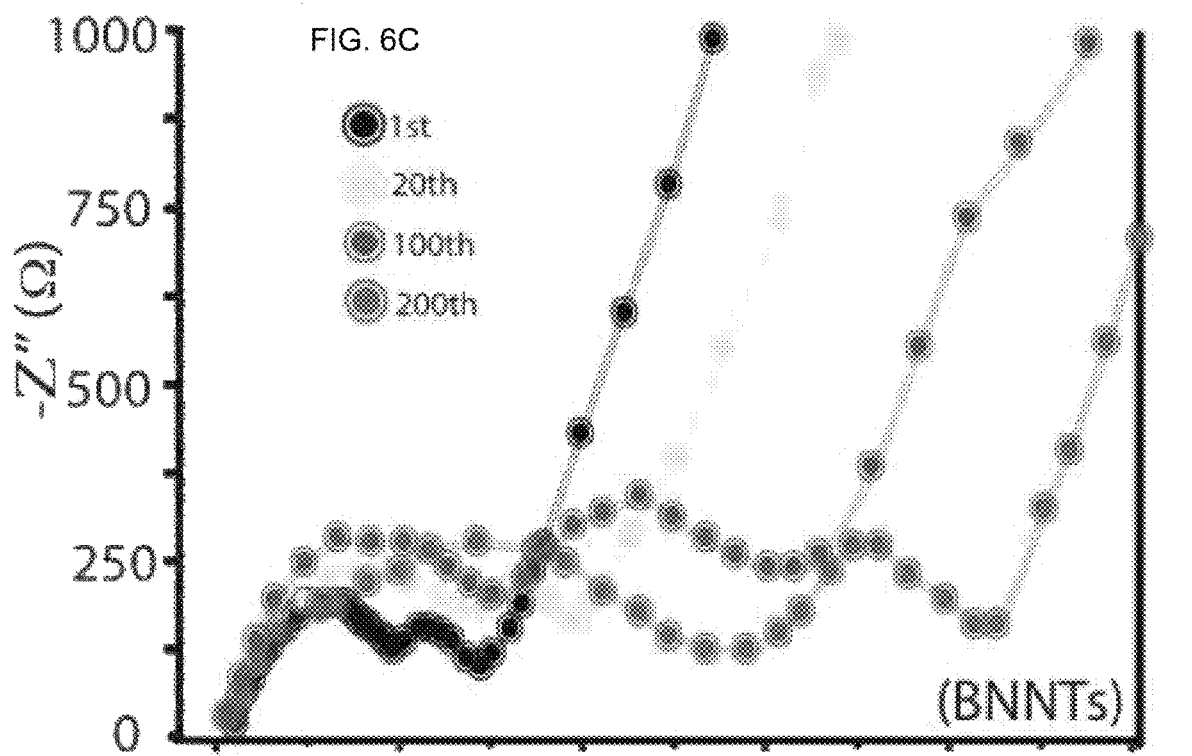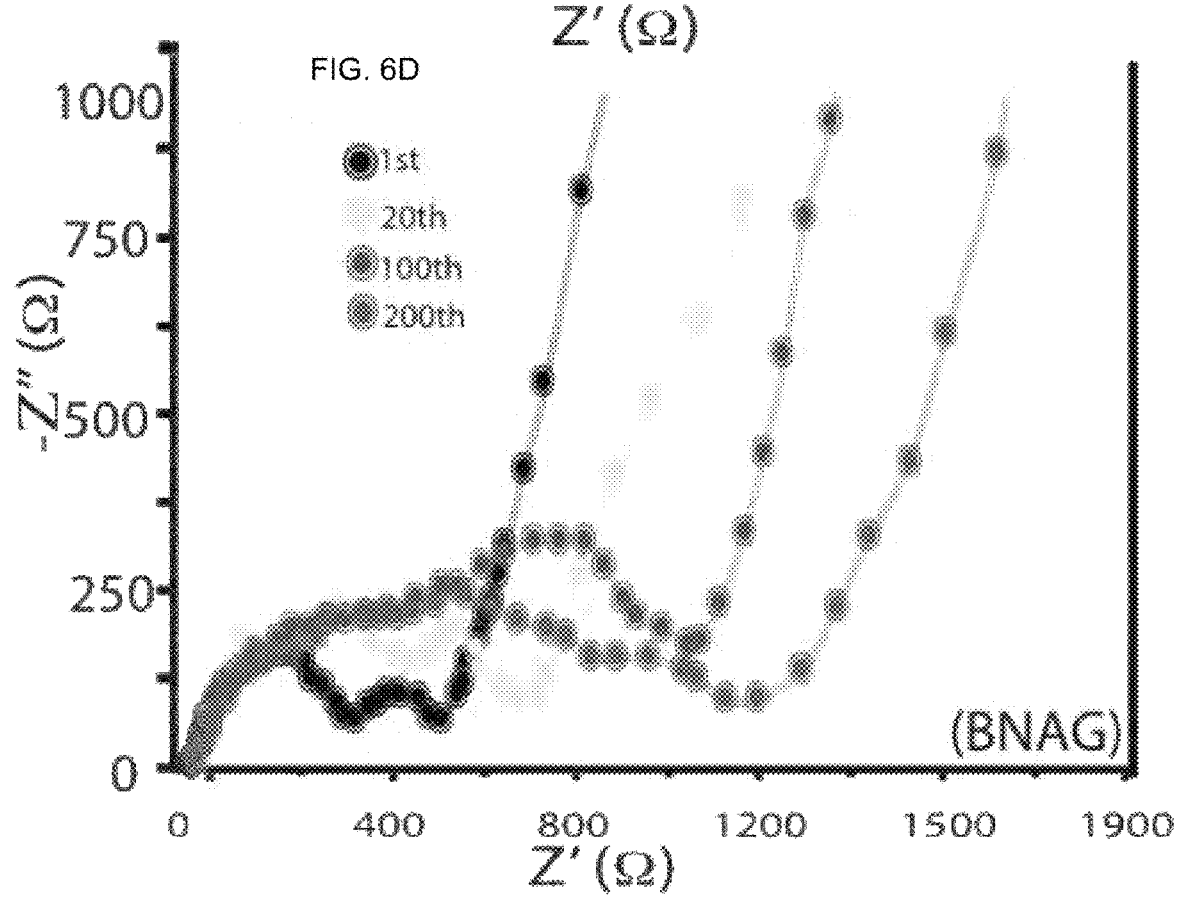

HIGH TEMPERATURE LI-ION BATTERY CELLS UTILIZING BORON NITRIDE AEROGELS AND BORON NITRIDE NANOTUBES

RELATED APPLICATIONS

This is a continuation of U.S. patent application Ser. No. 16/869,333, filed May 7, 2020, which is a continuation of U.S. patent application Ser. No. 15/822,563, filed Nov. 27, 2017, now U.S. Pat. No. 10,686,227, issued Jun. 16, 2020, which claims priority to U.S. Provisional Patent Application No. 62/428,874, filed Dec. 1, 2016, the entire content of which are hereby incorporated by reference herein.

STATEMENT OF GOVERNMENT SUPPORT

This invention was made with government support under Contract No. DE-AC02-05CH11231 awarded by the U.S. Department of Energy, under Grant No. 1542741 awarded by the National Science Foundation, and under Grant No. N00014-12-1-1008 awarded by the Office of Naval Research (MUM). The government has certain rights in this invention.

TECHNICAL FIELD

This disclosure relates generally to batteries and more particularly to lithium-ion batteries.

BACKGROUND

Despite the many advantages and wide commercial usage of lithium-ion batteries, there remain substantial performance limitations and safety concerns. The most serious safety issue involves operating temperature range and stability. An increase in internal temperature of the battery cell can lead to internal pressure build up due to an accelerated reaction rate between the electrolyte and electrodes. Mechanical stress then damages the electrolyte and separator, resulting in an increased internal resistance and thermal runaway. The cell may then short circuit and possibly explode. Since Li-ion batteries self-heat naturally as they are operated (discharged or charged), developing Li-ion batteries with high temperature operation capability is vital for overall safety and reliability. Today's commercial Li-ion battery cells are typically unreliable if operated above 60° C., and virtually none can survive operation above 100° C.

BRIEF DESCRIPTION OF THE DRAWINGS

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

FIG. 4A shows the impedance of Li-ion cells with different electrolyte complexes. FIG. 4B shows the temperature dependence of ionic conductivity of different electrolyte matrices.

FIGS. 6A-6D show impedance spectra of the Li-ion cells. The impedance of the cells at different temperatures; (FIG. 6A) the cells with BNNTs modification and (FIG. 6B) the cells with BNAG modification. The impedance of the cells with different cycle numbers; (FIG. 6C) the cells with BNNTs modification and (FIG. 6D) the cells with BNAG modification.

(FIG. 7A) the cells with BNNTs, and (FIG. 7B) the cells with BNAG modifications.

DETAILED DESCRIPTION

Figure 1:
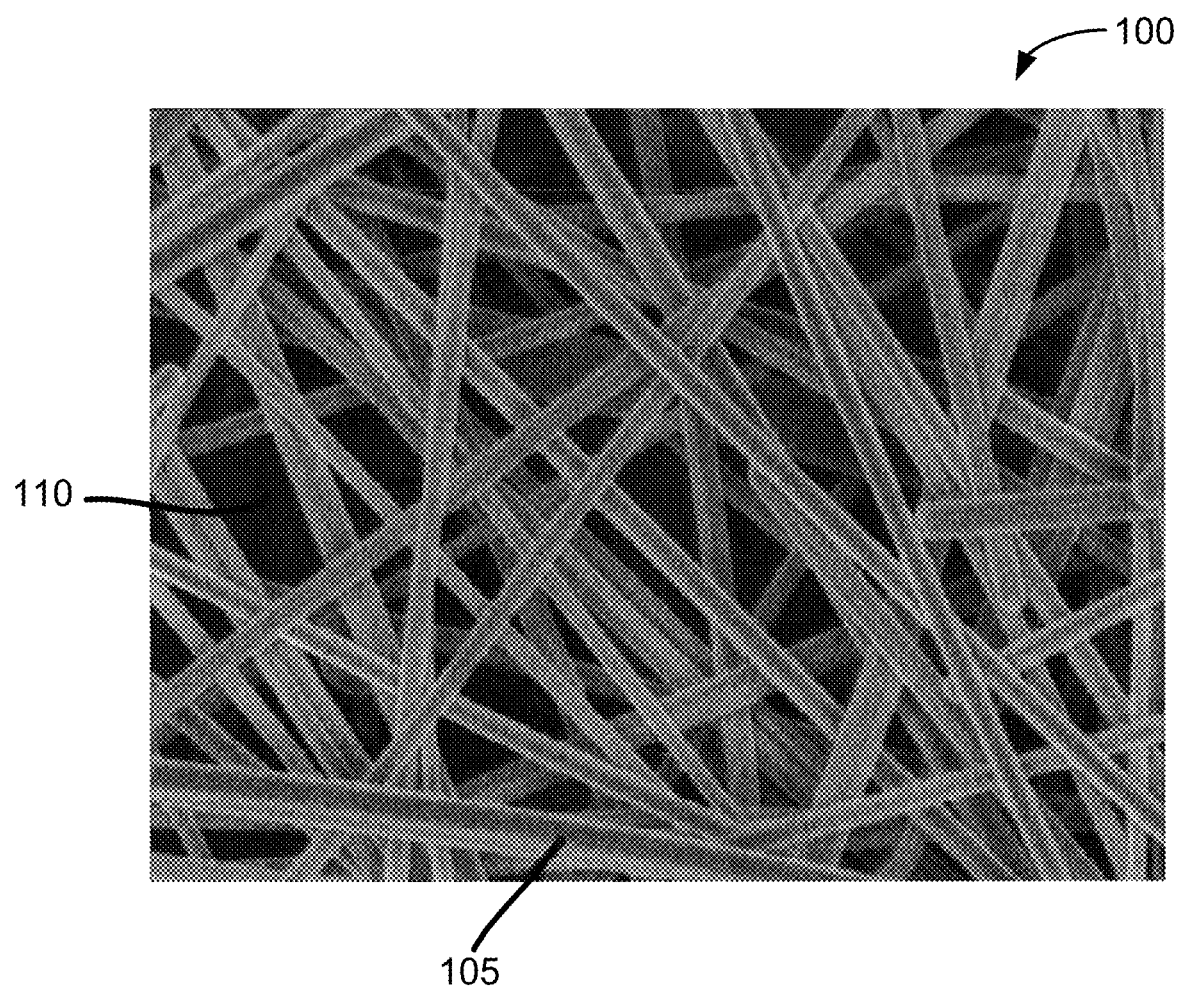
FIG. 1 shows an example of a schematic illustration of an electrolyte structure including a mesh comprising a plurality of boron nitride nanotubes.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a value is close to a targeted value, where close can mean, for example, the value is within 80% of the targeted value, within 90% of the targeted value, within 95% of the targeted value, or within 99% of the targeted value.

High temperature is the bane of Li-ion batteries. Battery cell capacity, efficiency, and cyclability all fade at even slightly elevated temperatures. Even worse, high temperature operation can lead to internal shorting, with consequent thermal runaway and catastrophic (explosive) failure. There are very few existing Li-ion battery architectures that can operate reliably above 60° C., and virtually none above 100° C. Described herein is improved thermal stability in Li-ion batteries by incorporating either a boron nitride aerogel or boron nitride nanotubes into an electrolyte (e.g., a PAN/

PMMA based electrolyte). Li-ion cells with these electrolyte complexes exhibit excellent performance and operational stability up to 190° C.

To achieve a Li-ion cell capable of relatively high temperature operation (T>60° C.), the liquid electrolyte can be replaced with a polymer electrolyte. This yields other benefits including enhanced processability, flexibility, and lighter weight. However, polymer electrolytes still lose their integrity at temperatures above 100° C. This has led to an examination of reinforced polymer electrolytes. The reinforcements are largely designed to increase strength, toughness, and flexibility of the polymer. Carbon based materials are promising candidates for such modifications.

Interestingly, honeycomb hexagonal boron nitride (h-BN) based nanomaterials can have properties far superior to their carbon counterparts, such as higher oxidation resistance and outstanding high temperature stability, with no compromise in mechanical strength. h-BN also is electrically insulating and thermally conductive. These unique properties make h-BN attractive fillers in mechanical and thermally-stable enhanced polymer composites. With a similar $sp^2$-bond configuration to graphene, h-BN can be synthesized in analogous low dimensional forms, such as BN nanotubes (BNNT), BN nanosheets, and BN aerogels (BNAG).

Described herein is an electrolyte structure (also referred to as an electrolyte complex herein) for Li-ion batteries that is formed by embedding BNAGs or BNNTs into an electrolyte (e.g., a polymer-ionic liquid gel) to increase the electrolyte temperature stability. The advantages in chemical inertness, thermal stability, and high surface area of BNAG and BNNTs elevate the reliable and safe battery operation temperature to 190° C., while still maintaining high capacity and cyclability.

In some embodiments, an electrolyte structure for a Li-ion battery comprises an electrolyte with an interconnected boron nitride structure disposed therein. In some embodiments, the interconnected boron nitride structure comprises hexagonal boron nitride. In some embodiments, the electrolyte comprises an organic electrolyte. In some embodiments, the organic electrolyte comprises a polymer electrolyte. In some embodiments, the polymer electrolyte comprises a polymer mixture comprising an ionic conducting polymer comprising a polymer mixed with a lithium salt. In some embodiments, the polymer is selected from a group consisting of poly(propylene oxide) (PPO), poly(ethylene oxide) (PEO), poly(acrylonitrile) (PAN), poly(vinylidene fluoride) (PVDF), and poly(methyl methacrylate) (PMMA). Polymer electrolytes generally are able to function at higher temperature compared to some organic electrolytes. In some embodiments, the organic electrolyte is selected from a group consisting of an organic ester, an organic ether, and ethylene carbonate (EC). In some embodiments, the organic electrolyte is coupled with a linear carbonate co-solvent, such as dimethyl carbonate (DMC), diethyl carbonate (DEC), or ethylmethyl carbonate (EMC), for example. In some embodiments, the organic electrolyte is doped with lithium hexafluorophosphate ($LiPF_6$).

In some embodiments, the interconnected boron nitride structure comprises a mesh comprising a plurality of boron nitride nanotubes. A mesh is a network (e.g., a group of interconnected objects) of the plurality of boron nitride nanotubes. Individual boron nitride nanotubes are in contact with other boron nitride nanotubes in the mesh. Such a mesh may be also considered a sheet of material comprising the plurality of boron nitride nanotubes.

As shown in FIG. 1, in some embodiments, an electrolyte structure 100 includes an electrolyte 110 with a plurality of boron nitride nanotubes (one boron nitride nanotube is labelled 105) disposed in the electrolyte 110. The electrolyte structure 100 may be considered a composite. In some embodiments, boron nitride nanotubes of the plurality boron nitride nanotubes have a length of about 30 nanometers (nm) to 1 micron. In some embodiments, the boron nitride nanotubes of the plurality boron nitride nanotubes have a diameter of about 1 nm to 20 nm or about 5 nm to 20 nm. In some embodiments, the mesh has a thickness of about 250 nm to 1.5 microns, or about 500 nm to 1 micron. In some embodiments, the mesh has a volume fraction of about 2% to 50% in the electrolyte structure 100.

Figure 2:
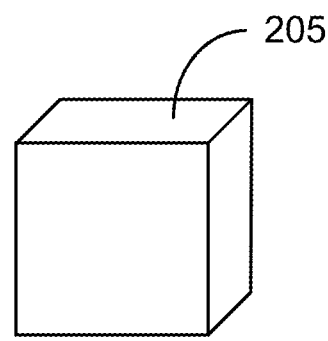
FIG. 2 shows an example of a schematic illustration of an electrolyte structure including a boron nitride aerogel.

In some embodiments, the interconnected boron nitride structure comprises a boron nitride aerogel. FIG. 2 shows an example of a schematic illustration of electrolyte structure 205 including an aerogel. An aerogel is a porous ultralight material derived from a gel. An aerogel is a gel in which the liquid component of the gel has been replaced with a gas (e.g., air). In some embodiments, the boron nitride aerogel has pore sizes of less than about 100 nm. In some embodiments, the boron nitride aerogel has pore sizes of about 2 nm to 100 nm. In some embodiments, the boron nitride aerogel has a thickness of about 250 nm to 1.5 microns, about 500 nm to 1 micron, or about 500 nm to 25 microns. In some embodiments, the boron nitride aerogel has a volume fraction of about 2% to 50% in the electrolyte structure 205. In some embodiments, the boron nitride aerogel has a density as low as 0.6 $mg/cm^3$. In some embodiments, the boron nitride aerogel has a specific surface area as high as 1050 $m^2/g$.

In some embodiments, a plurality of titanium dioxide ($TiO_2$) nanoparticles is disposed in the electrolyte. In some embodiments, titanium dioxide nanoparticles of the plurality of titanium dioxide nanoparticles have a diameter of about 1 nm to 100 nm. In some embodiments, the plurality of titanium dioxide nanoparticles has a volume fraction of about 5% to 30% in the electrolyte structure. Titanium dioxide nanoparticles can improve that charge/discharge performance of a cell and can enhance ion concentration in a cell. Other nanoparticles can also be added to the electrolyte to achieve similar performance enhancements. Such nanoparticles include germanium-based nanoparticles (e.g., GeS), cobalt-iron oxide based nanoparticles (e.g., $Co_3O_4$, $Fe_3O_4$, $CoFe_2O_4$), and molybdenum-based nanoparticles (e.g., $MoO_3$).

Benefits of an interconnected boron nitride structure disposed in an electrolyte incorporated in a Li-ion battery include higher temperature operation of the Li-ion battery. In some embodiments, a Li-ion battery including an interconnected boron nitride structure disposed in an electrolyte is operable up to temperatures of about 190° C. In some embodiments, an interconnected boron nitride structure (e.g., a mesh comprising nanotubes or an aerogel) serves to distribute heat more evenly in the Li-ion battery compared to boron nitride nanoflakes or boron nitride nanoparticles (both of which do not form interconnected structures) due to the higher thermal conductivity of the interconnected structure.

In some embodiments, when localized thermal runaway occurs in a Li-ion battery, the interconnected boron nitride structure can aid in preventing contact between the anode and cathode and aid in preventing ion conduction in the localized region of the thermal runaway. Further, due to the high thermal conductivity of boron nitride, heat is dissipated quickly at the localized regions. While not wanting to be bound by any theory, in localized regions that reach high temperatures, it is believed that the interconnected boron nitride structure "collapses" and the porosity of the interconnected boron nitride structure decreases in the localized region of the thermal runaway. The decrease in the porosity of the interconnected boron nitride may be due to high temperatures stressing cross-links in the boron nitride aerogel which causes a collapse in the region.

Figure 3:
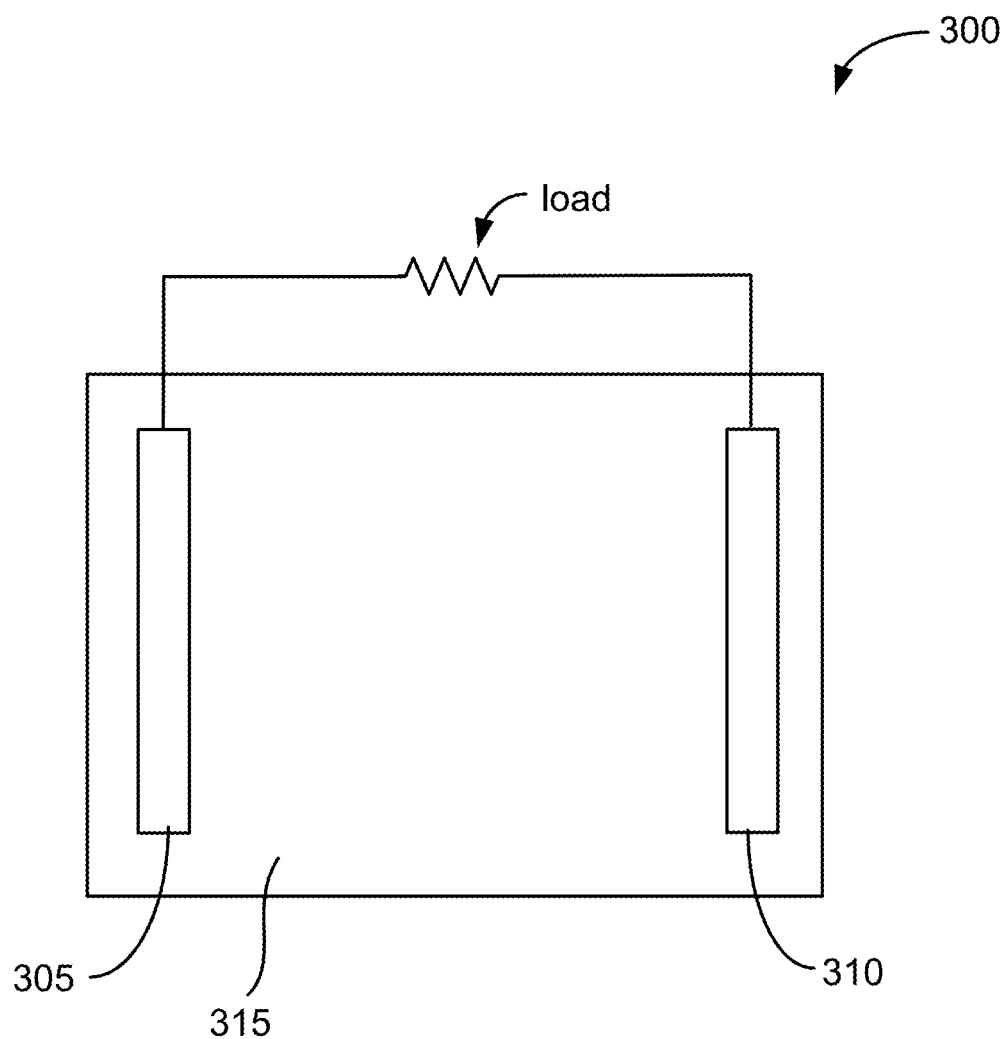
FIG. 3 shows an example of a schematic illustration of a lithium ion battery.

FIG. 3 shows an example of a schematic illustration of a lithium ion battery. As shown in FIG. 3, a lithium ion battery 300 includes an anode 305, a cathode 310, and an electrolyte structure 315. When in operation, the lithium ion battery 300 provides current to a load. The electrolyte structure 315 is in contact with the anode 305 and the cathode 310. The electrolyte structure 315 comprises any of the electrolyte structures (e.g., an electrolyte having a boron nitride aerogel or a plurality of boron nitride nanotubes disposed therein) described herein.

In some embodiments, the anode 305 comprises lithium titanate ($Li_4Ti_5O_{12}$) or graphite. In some embodiments, the cathode 310 comprises lithium-rich manganese oxide ($Li_{1+x}Mn_{2-x}O_4$) or lithium cobalt oxide ($LiCoO_2$). In some embodiments, the polymer membrane is a cation conductor and is not electrically conductive. In some embodiments, the electrolyte structure is about 250 nm to 1.5 microns thick, or about 500 nm to 1 micron thick.

In some embodiments, a method of fabricating an electrolyte structure includes providing an interconnected boron nitride structure. Methods of fabricating boron nitride nanotubes are described in U.S. Pat. No. 9,394,632, titled "Method and device to synthesize boron nitride nanotubes and related nanoparticles," and U.S. patent application Ser. No. 15/321,177, titled "System and methods for fabricating boron nitride nanostructures," filed Jun. 24, 2015, both of which are herein incorporated by reference. After fabrication of boron nitride nanotubes, the nanotubes may be cleaned in a solvent. Filter paper may be used to separate the nanotubes from the solvent. A mesh is formed by the nanotubes drying on the filter paper. Methods of fabricating boron nitride aerogels are described in U.S. Pat. No. 9,611,146, titled "Crystalline boron nitride aerogels," which is herein incorporated by reference.

In some embodiments, the interconnected boron nitride structure is then contacted with an electrolyte. The electrolyte flows into the interconnected boron nitride structure. In some embodiments, the interconnected boron nitride structure is immersed in the electrolyte. In some embodiments, operations with the electrolyte are performed in vacuum environment or an inert (e.g., argon) environment. After the electrode structure is fabricated, the Li-ion battery is assembled, with the electrode structure being positioned between an anode and a cathode.

In some embodiments, an interconnected boron nitride structure is positioned between and in contact with an anode and a cathode. For example, a sheet of a boron nitride aerogel may be positioned between and in contact with an anode and a cathode. As another example, a mesh comprising a plurality of boron nitride nanotubes may be positioned between and in contact with an anode and a cathode. The electrolyte is then contacted with or injected into the interconnected boron nitride structure. In some embodiments, operations with the electrolyte are performed in vacuum environment or an inert (e.g., argon) environment.

In some embodiments, the electrolyte is at an elevated temperature when it comes into contact with the interconnected boron nitride structure. When the electrolyte cools (i.e., cools below the glass transition temperature), it solidifies. This forms a solid state ion conducting structure.

EXAMPLE

The following examples are intended to be examples of the embodiments disclosed herein, and are not intended to be limiting.

Electrolyte complexes were prepared by mixing either BNNTs or BNAG with polymethylmethacrylate (PMMA) and polyacrylonitrile (PAN) (1:2:9 weight percentages) dissolved in anisole. Subsequently this mixture was incorporated into the ionic liquid $PYR_{14}$-TFSI-LiTF SI ($PYR_{14}$: N-methyl-N-butylpyrrolidinium, TFSI: bis(trifluoromethylsufonyl)imide). In some instances, $TiO_2$ nanoparticles were added to the solution in order to enhance the concentration of ions in the cell. The most common, commercially available electrodes were used for the anode and cathode: lithium titanate ($Li_4Ti_5O_{12}$) as the anode and lithium-rich manganese oxide ($Li_{1+x}Mn_{2-x}O_4$) as the cathode. The $Li_4Ti_5O_{12}$ is a high performance, zero strain electrode with a lithium insertion potential of 1.55 V. $Li_{1+x}Mn_{2-x}O_4$ has excellent compatibility with $Li_4Ti_5O_{12}$ due to the similar spinel structure. Further details about materials synthesis and sample preparation can be found below.

The cells were first characterized based on their ionic conductivities and concentration. One potential concern for BN filler materials is that, though they can be used to form more mechanically stable polymer electrolytes, their insulating properties can lower ion concentrations and inhibit their motion across the cell. The lithium ion transference number ($t_{Li}^+$) readily determines the ion concentration gradient in the electrolyte during the charge and discharge process and is related to the number of moles of lithium ions passing through the electrolyte per unit capacitance. In order to determine the transference number for the BNNT and BNAG samples, lithium symmetric cells (Li/electrolyte/Li) were prepared and a previously described dc polarization measurement was used. Results of these measurements are reported in Table 1.

TABLE 1

Lithium transference number for different electrolyte gel compositions, at selected temperatures.

| Electrolyte gel | Solvent ratio | $t_{Li}^+$ (24° C.) | $t_{Li}^+$ (60° C.) | $t_{Li}^+$ (80° C.) | $t_{Li}^+$ (100° C.) |
|---|---|---|---|---|---|
| PAN-PMMA | 2:9 | 0.652 | 0.691 | 0.713 | 0.774 |
| BNAG-PAN-PMMA | 1:2:9 | 0.482 | 0.501 | 0.532 | 0.593 |
| BNNT-PAN-PMMA | 1:2:9 | 0.392 | 0.412 | 0.443 | 0.501 |
| $TiO_2$-BNAG-PAN-PMMA | 1:6:2:7 | 0.583 | 0.596 | 0.621 | 0.641 |
| $TiO_2$-BNNT-PAN-PMMA | 1:6:2:7 | 0.471 | 0.487 | 0.505 | 0.549 |

In general, values of $t_{Li}^+$ approaching unity are desirable to assure gradient homogeneity across the electrolyte. However, in most of the cases, adding a filler such as BNAG or BNNT into the electrolyte system can produce an internal charge. This internal charge can create an additional polarization loss due to a possible ion exchange between the composite and the ionic liquid). Thus transference numbers less than one are typical for composite electrolytes. For example, PAN/PMMA based ionic gel systems have transference numbers on the order of 0.5-0.7. As shown in Table 1, $t_{Li}^+$ for the electrolytes without filler, with BNAG filler, and with BNNT filler are 0.65, 0.48, and 0.39 at room temperature, respectively. Importantly, it was found that the ion transference number increases with increasing temperature (respective values become 0.77, 0.59, and 0.50 at 100° C.). Furthermore, $t_{Li}^+$ for the BNAG and BNNT containing electrolytes is increased by 20% by adding a small amount of TiO2 nanoparticles, yielding 0.58 for $TiO_2$/BNAG addition and 0.47 for $TiO_2$/BNNT addition at room temperature, and 0.64 and 0.55 at 100° C., respectively. These $t_{Li}^+$ values are acceptable.

Figure 4A:
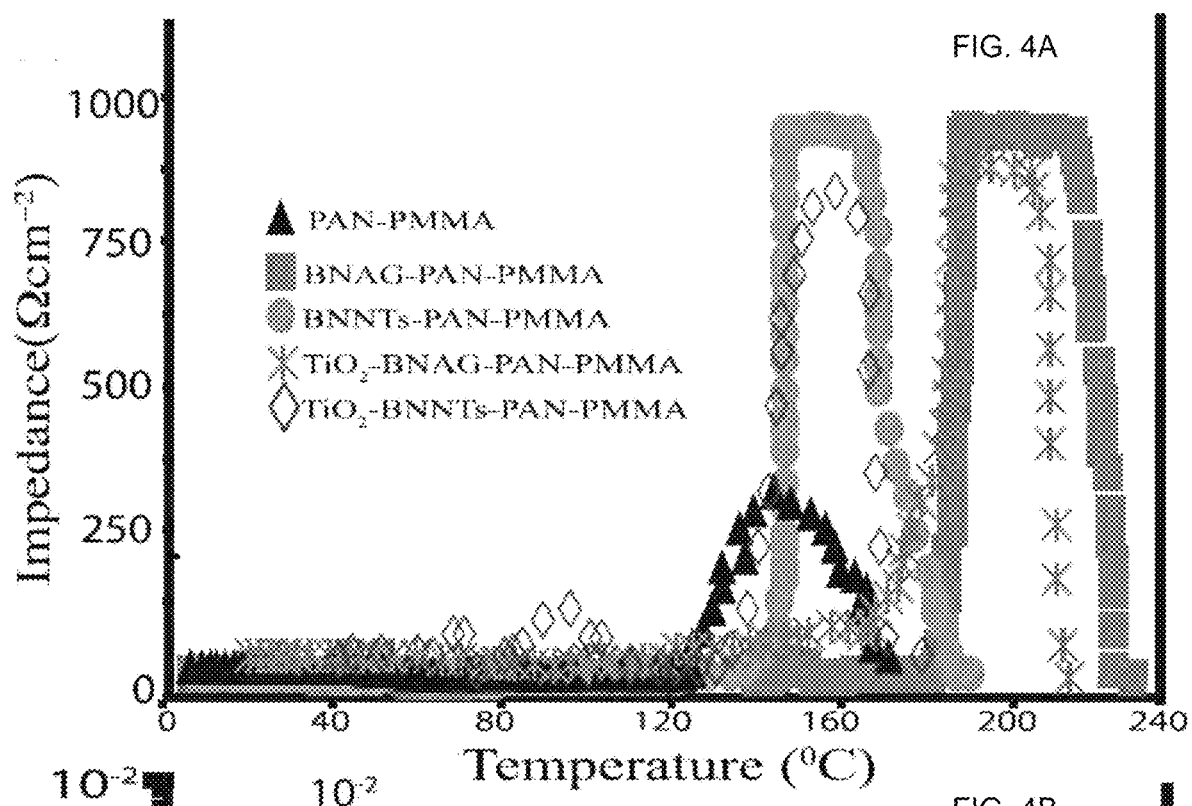
FIGS. 4A and 4B show the electrical response characteristics of Li-ion cells.

The thermal stability of the different electrolyte compositions was investigated by solution impedance and ionic conductivity measurements at different temperatures. FIG. 4A shows the ac impedance of the electrolytes as a function of temperature. Sharp increases are observed at 120° C. for unfilled PAN-PMMA, and at 145° C. and 190° C. for electrolyte filled with BNNTs and BNAG, respectively. Additions of $TiO_2$ have only a minor effect on the impedance thresholds for the BNNT and BNAG samples. The rapid increase in impedance signals failure of the electrolyte complex in blocking active ionic transport. Thereafter the impedance grows quickly with increasing temperature, which causes severe pressure build up in the cells due to gas generation. This causes the electrolyte complex to fail entirely and short circuit the cell internally, whereupon the impedance drops precipitously.

The improvements in thermal stability for the BNNT and BNAG fillers suggested by the impedance threshold data of FIG. 4A are even more dramatic than the figure implies. In particular, the electrolyte must withstand repeated cycling. At 120° C., it was found that unfilled PAN-PMMA is prone to failure after only a few cycles, whereas the BNNT and BNAG filled cells show stable behavior over at least 500 cycles at 145° C. and 190° C., respectively.

Figure 4B:
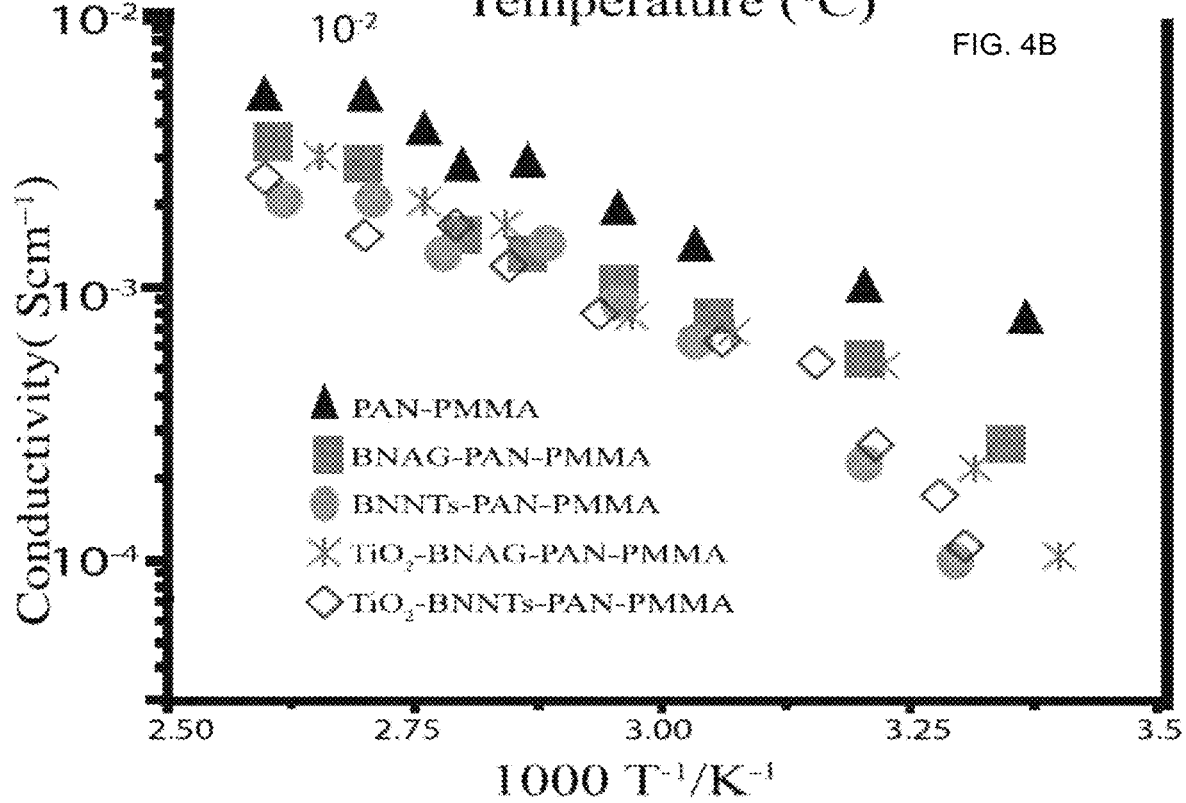

FIG. 4B shows the relationship of ionic conductivity of the electrolyte with respect to temperature. As expected, the electrolyte with only PAN/PMMA has the highest ionic conductivity, but the electrolyte composites with BNAG and BNNTs also exhibit good conductivity. The reason the cells with BNAG have higher performance than the cells with BNNTs is the ability of BNAG to absorb more of the ionic solution due to its higher specific surface area. Adding $TiO_2$ nanoparticles does not appreciably affect the temperature limit but does slightly increase ionic conductivity. The data of FIGS. 4A and 4B indicate that polymer reinforcements with BNAG and BNNTs increase the strength and structural integrity of the polymer. With these fillers, the polymer can survive elevated temperatures and elevated internal pressures.

Figure 5:
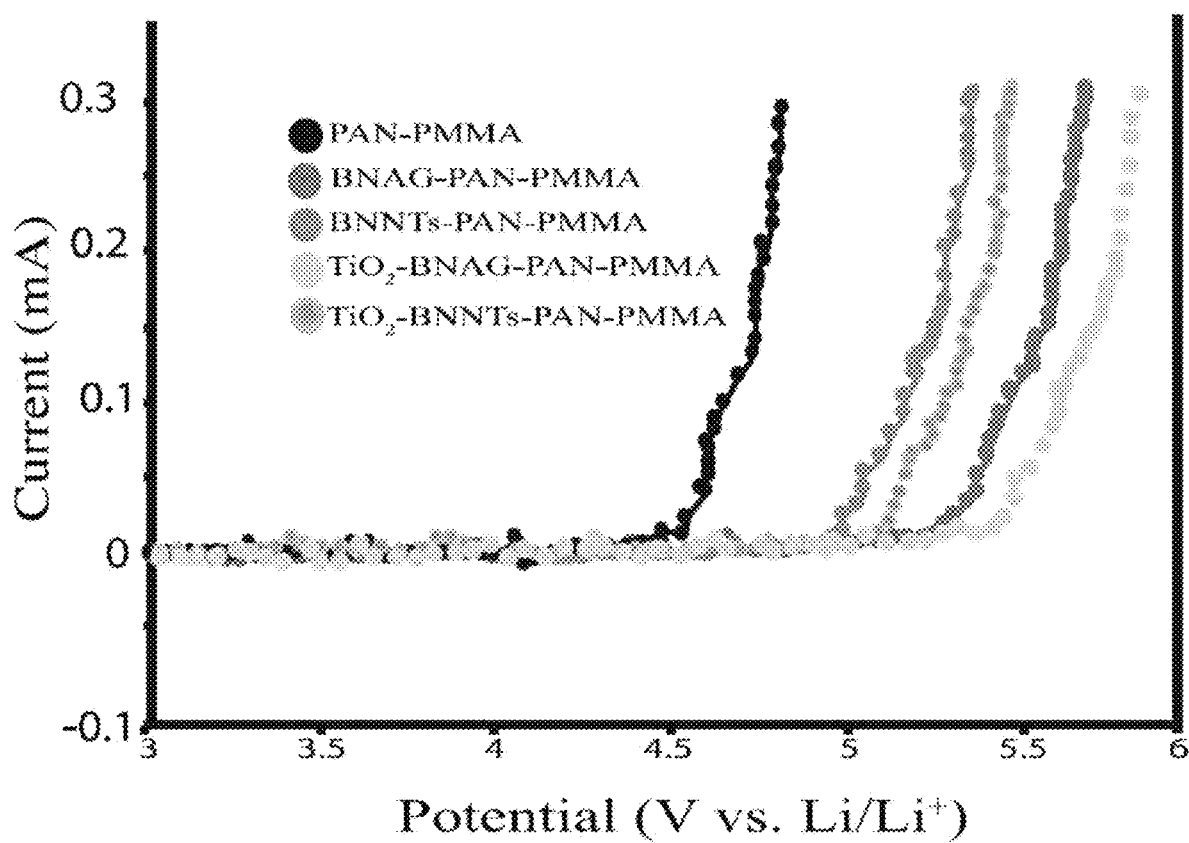
FIG. 5 shows the current voltage response of different electrolyte complexes at 100° C. with a scan of 1 $mVs^{-1}$.
Figure 6A:
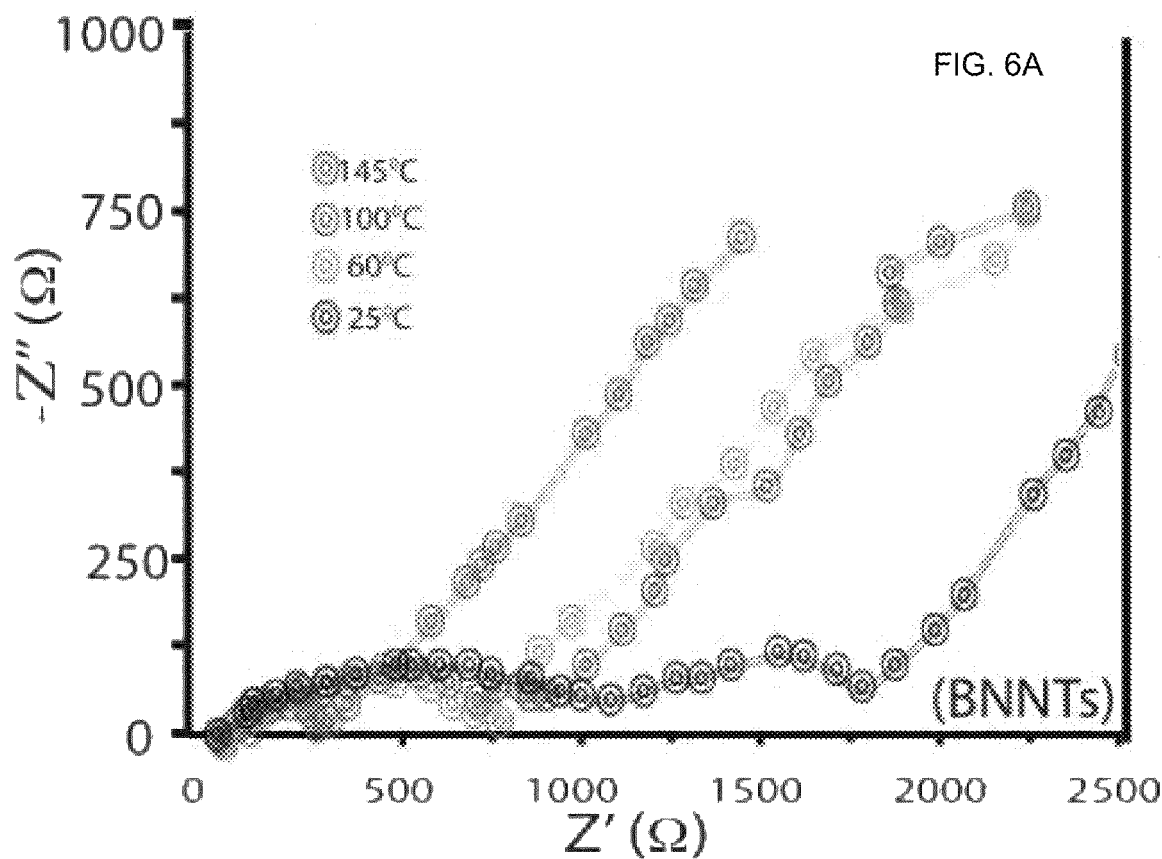
Figure 6B:
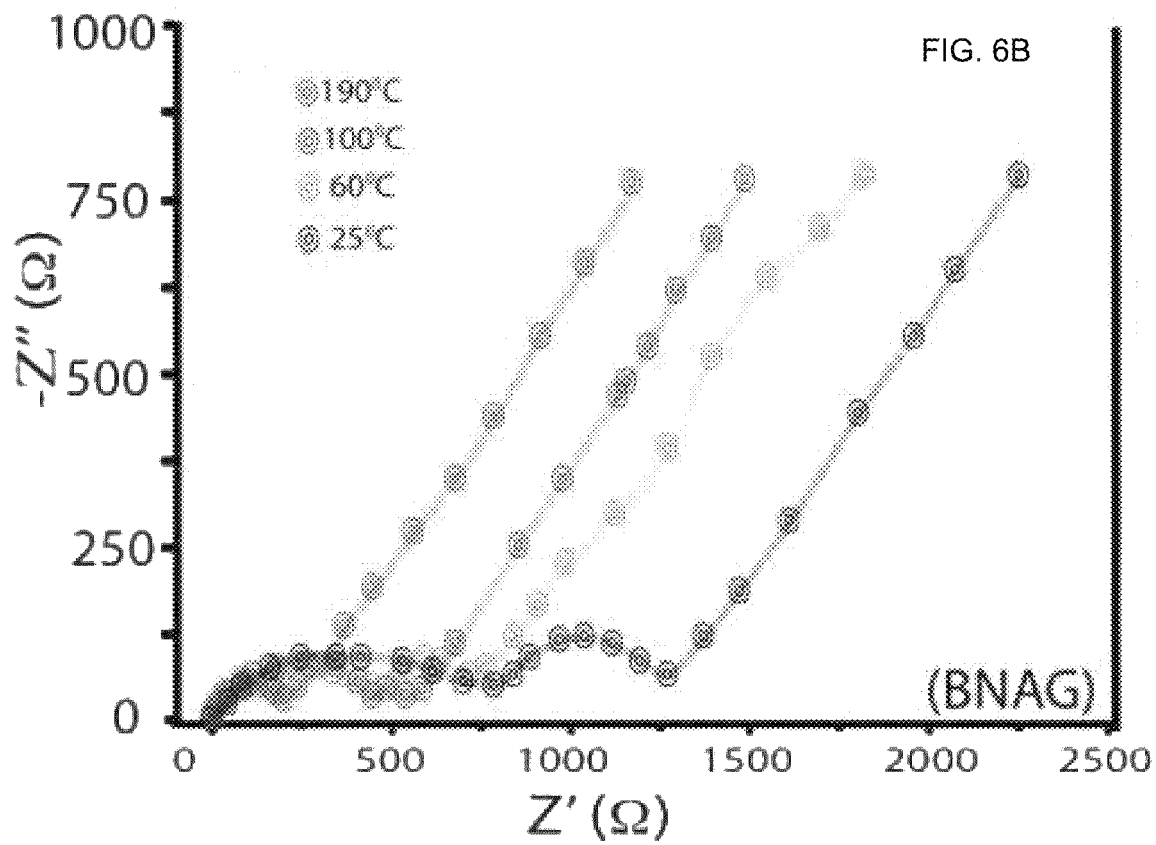

The electrochemical stability and anodic decomposition of the cells was tested by measuring the current-voltage response using linear voltage sweeps at 100° C. As shown in FIG. 5, the BNNT electrolyte complex has an anodic stability up to 5.05V vs. Li at this elevated temperature. The decomposition voltage of the BNAG electrolyte complex extends above 5.4V vs. Li, indicating additional electrolyte absorption ability of BNAG which further improves electrochemical stability of the electrolyte. The cells with $TiO_2$ nanoparticles show slightly more improved anodic stability. This nested electrolyte design shows good anodic stability, which makes it compatible with negative electrode systems (e.g., carbon or silicon based), essential to high-voltage batteries for high energy applications.

The impedance of the cells at different temperature and cycle number was measured by alternating-current impedance spectroscopy (FIGS. 6A-6D). With this method, the interface between the electrode and the polymer electrolyte is directly probed. The resistances can be broken down into three regimes: data at high frequencies are related to ionic conductivity, at medium frequencies to the charge transfer between electrodes, and at lower frequencies to diffusion of lithium ions in the cathode. When temperature increases, data become more intertwined and indistinguishable because of higher chemical reactivity. The thermal energy flowing in the cell provides more kinetic energy to the ions which causes the ions, at interfaces, to begin to move much faster toward the electrodes. Thus, ionic conductivity increases, diffusion processes become predominant, and the impedance decreases. Cells with BNNTs exhibit higher impedance at elevated temperatures than cells containing BNAG, which indicates that ionic diffusion is more efficient through the BNAG electrolyte complex.

In order to establish overall cell performance characteristics, the variation of impedance with the cycle number (FIGS. 6C and 6D) was determined. As cycle number increases the data at the middle frequency region increase due to capacity fading. The porosity of the cathode slowly decreases due to accumulation of residual reactants at the interface. The cells with BNAG and BNNTs have similar characteristics throughout the first 20 cycles. However, at later cycles, the cells with BNAG modification exhibit lower resistance and have better overall charge-transfer than cells with BNNTs, which indicates the BNAG electrolyte complex has better interface stability which improves electrolyte retention characteristics. The cells with no fillers exhibit a similar trace at the first two cycles but then show a marked increase in resistance. The cells with $TiO_2$ nanoparticles exhibit better behavior at the middle frequency region, as expected, but poor characteristics in the low frequency region due to poor interstitial diffusion.

Figure 7A:
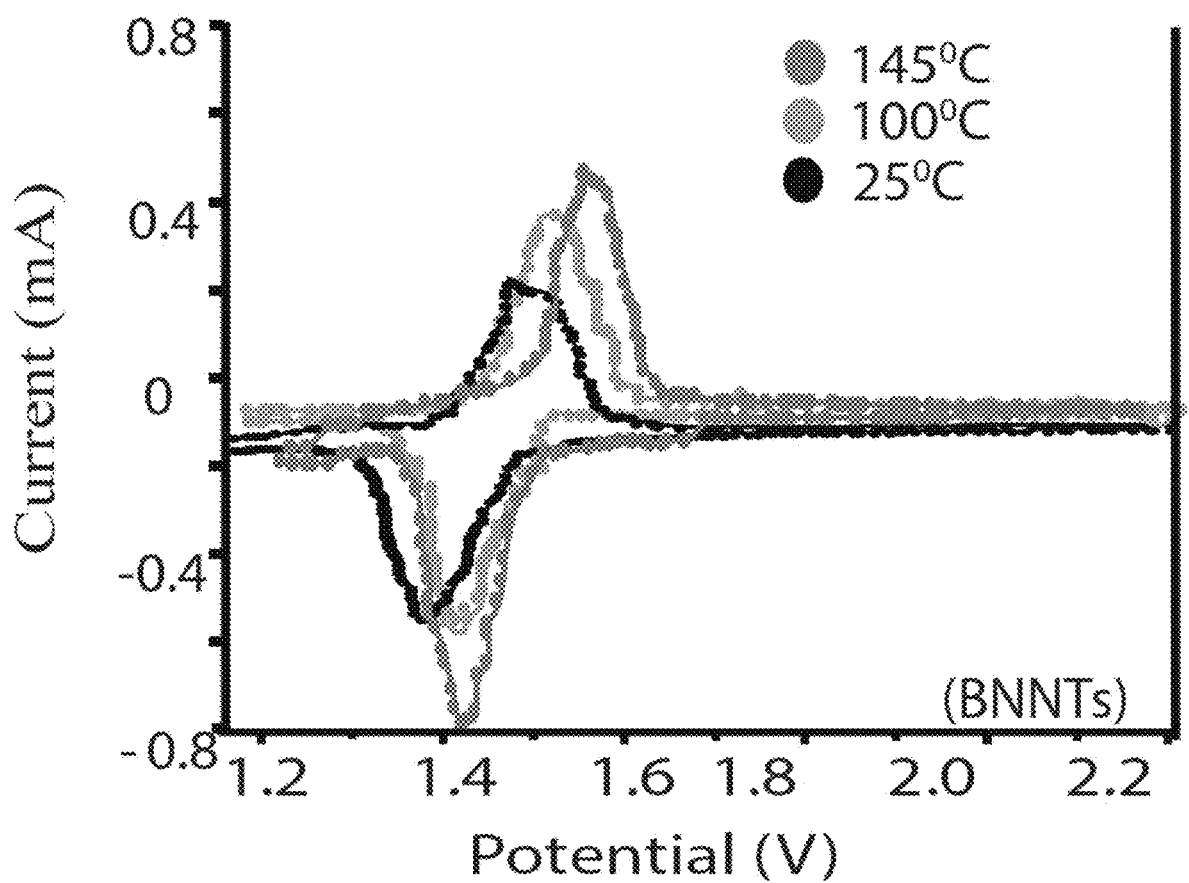
FIGS. 7A and 7B show cyclic voltammograms of Li-ion half cells with $Li_4Ti_5O_{12}$ at different temperatures.
Figure 7B:
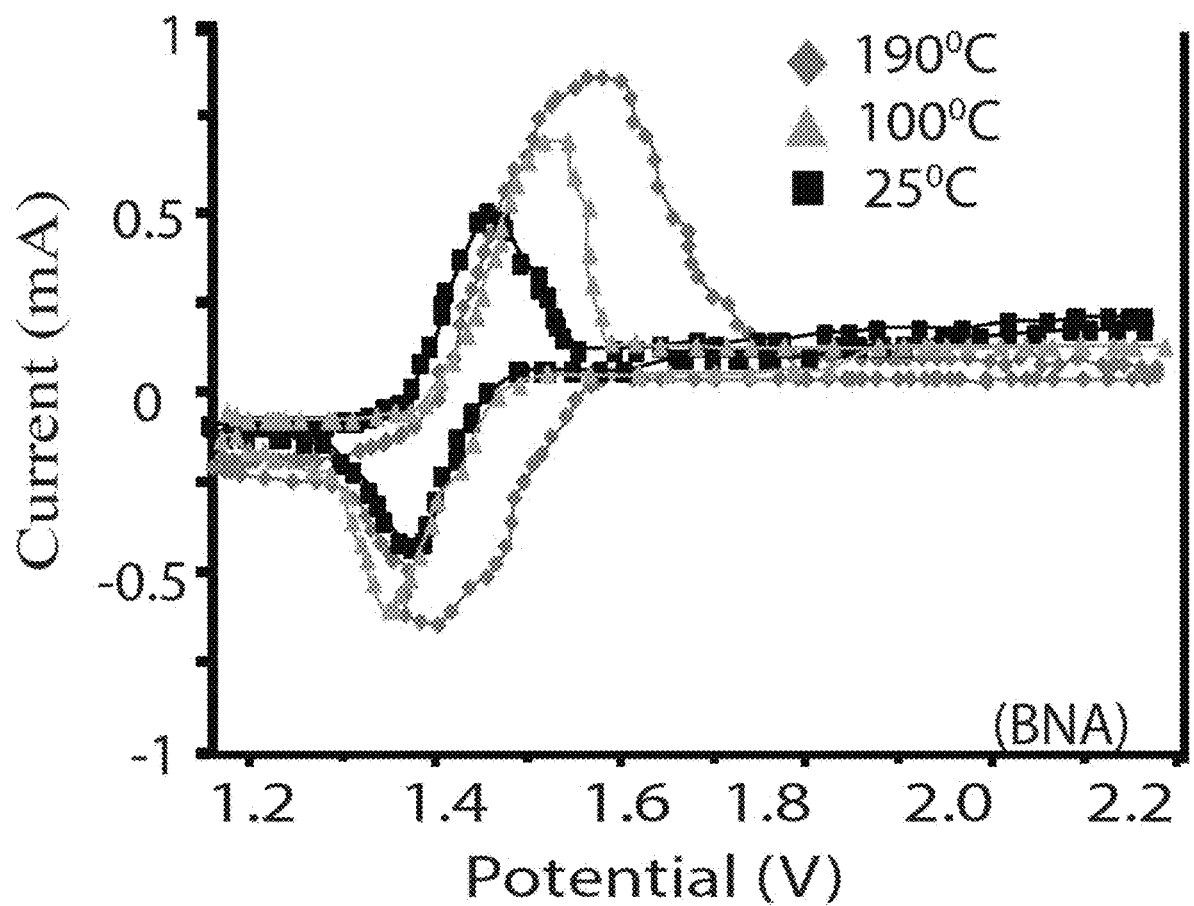
Figure 7C:
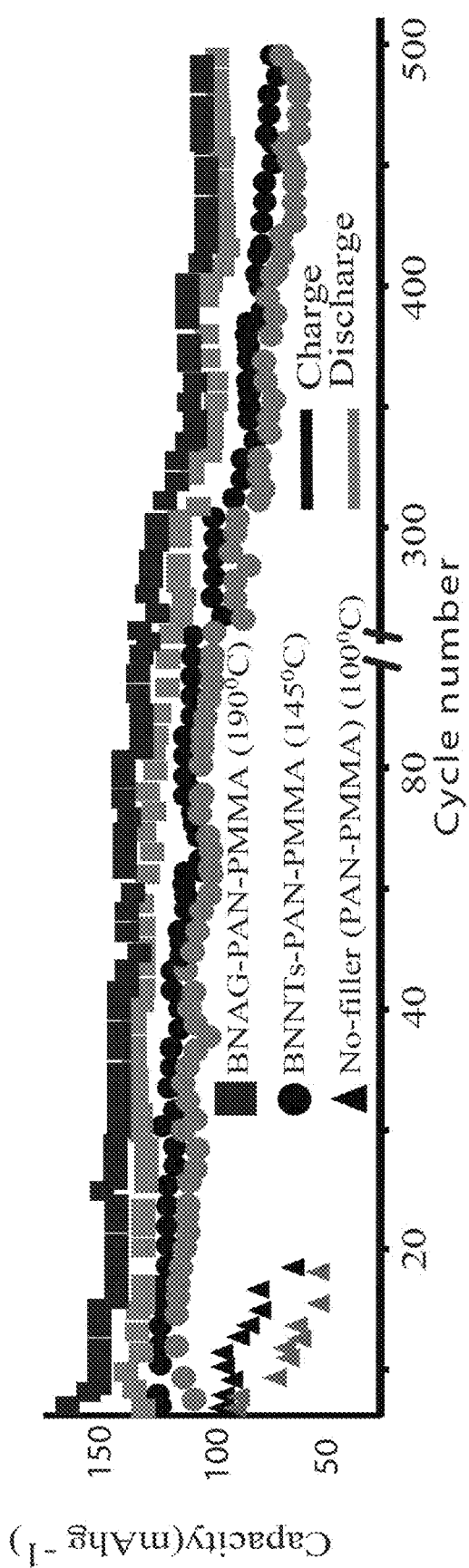
FIG. 7C shows the performance of Li-ion cells with and without BNAG and BNNTs modification. These cells are studied at elevated temperatures for a Li-ion battery. The cells were tested at 190° C., 145° C., and 100° C. for BNAG, BNNTs, and no filler, respectively.

FIGS. 7A and 7B show cyclic voltammograms of cells with BNAG and BNNTs modifications at different temperatures. FIG. 7C shows capacity vs. cycle number. These figures provide a clear indication of the importance of polymer reinforcement on cell performance. The symmetrical feature in the voltammograms corresponds to lithium insertion and extraction. The smooth and highly symmetric peaks indicate that the lithium insertion and extraction are reversible and no other reaction is involved during these processes. Increasing temperature results in an enhanced peak current and peak separation. The energy is also shifted due to the stronger diffusion process by 30 mV and 40 mV for BNNTs and BNAG, respectively. This behavior results in inequality of anodic and cathodic current behavior. But, as seen in FIGS. 7A-7C, cells are very stable even at high temperatures. These cells are very stable over 500 cycles at elevated temperatures (145° C. and 190° C. for BNNTs and BNAG, respectively), while the cells with no filler decline steadily after 5 cycles (FIG. 7C). The cells with $TiO_2$ yield better capacity at room temperature up to 100 cycles, but at elevated temperatures the cells suffer severe capacity degradation after the first 20 cycles. The battery power loss at elevated temperatures could be because of the parasitic reactions among the solvents and $TiO_2$ interface.

Details of Electrolyte and Electrode Preparation: The lithium titanate ($Li_4Ti_5O_{12}$), spinel nanopowder, (<200 nm particle size (BET))>99%) anode was prepared by casting a slurry of 80 wt % active material, 15 wt % conductive reagent (acetylene black), and 5 wt % poly-vinylidene difluoride (PVDF) binder on to aluminum (Al) foil. Lithium-rich manganese oxide ($LiMnO_4$) powder was mixed with acetylene black and PVDF at a rate of 85:10:5 (wt %) and coated on Al foil. Then the electrodes was dried at 100° C. in vacuum overnight. The loading ratio between the anode and cathode was ~2:5 by weight. PAN/PMMA electrolyte was prepared by a polymer solution casting method by reinforcing with BNNTs or BNAG at a rate 1:2:9 (wt %). This mixture was then activated with 1M ionic liquid $PYR_{14}$-TFSI-LiTFSI. This electrolyte mixture was then deposited onto the electrode surface as an individual solid layer by thickness of 150 microns to 250 microns.

Details of Electrochemical Characterization: The lithium transference number was measured in lithium symmetric cells (Li/electrolyte/Li) at room temperature with a dc polarization method. The electro chemical impedance spectroscopy, cyclic voltammetry, galvanostatic charge discharge analysis, and the ionic conductivity of the cells were taken by using computer controlled potentiostat-galvanostat and impedance analyzer at the frequency range from 0.1 Hz to 1000 kHz.

CONCLUSION

In conclusion, battery cells that can operate at high temperatures with a long cycle lifetime have been developed. Electrolyte complexes were prepared by embedding polymer electrolytes with BNAG and BNNTs. The cells with the BNAG modification display good electrolyte wettability with excellent ionic conductivity and transference number. These modifications also improve overall thermal protection of the battery cells. The cells with BNAG modification can operate up to 190° C. with over 500 cycles, while BNNTs extend safe and reliable operation up to 145° C. It was demonstrated that BNNT and BNAG modifications enable high voltage, high performance Li-ion batteries with outstanding performance and attractive safety features towards explosion proof batteries.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. An electrolyte structure for use in a battery comprising:
    a polymer electrolyte comprising a polymer mixed with a lithium salt; and
    an interconnected boron nitride mesh structure incorporated in the electrolyte and comprising a plurality of boron nitride nanotubes.

2. The electrolyte structure of claim 1, wherein the polymer comprises one of poly(propylene oxide) (PPO), poly(ethylene oxide) (PEO), poly(acrylonitrile) (PAN), poly(vinylidene fluoride) (PVDF), or poly(methyl methacrylate) (PMMA).

3. The electrolyte structure of claim 1, wherein the electrolyte comprises a solid-state ion conducting structure.

4. The electrolyte structure of claim 1, further comprising:
    a plurality of titanium dioxide nanoparticles disposed in the electrolyte.

5. The electrolyte structure of claim 4, wherein the plurality of titanium dioxide nanoparticles has a volume fraction of about 5% to 30% in the electrolyte structure.

6. The electrolyte structure of claim 1, wherein boron nitride nanotubes of the plurality of boron nitride nanotubes have a length of about 30 nanometers to 1 micron and have a diameter of about 1 nanometers to 20 nanometers.

7. The electrolyte structure of claim 1, wherein the interconnected boron nitride mesh structure has a thickness of about 250 nanometers to 1.5 microns.

8. The electrolyte structure of claim 1, wherein the plurality of boron nitride nanotubes comprises hexagonal boron nitride (h-BN).

9. The electrolyte structure of claim 1, wherein the electrolyte is operationally stable up to 190° C.

10. A battery comprising:
    an anode;
    a cathode; and
    an electrolyte structure, the electrolyte structure being in contact with the cathode and with the anode, the electrolyte structure comprising:
    a polymer electrolyte comprising a polymer mixed with a lithium salt; and
    an interconnected boron nitride mesh structure incorporated in the electrolyte and comprising a plurality of boron nitride nanotubes.

11. The battery of claim 10, wherein the battery is operable up to temperatures of about 190° C.

12. The battery of claim 10, wherein the anode comprises lithium titanate ($Li_4Ti_5O_{12}$) or graphite.

13. The battery of claim 10, wherein the cathode comprises lithium-rich manganese oxide or lithium cobalt oxide ($LiCoO_2$).

14. The battery of claim 10, wherein the interconnected boron nitride mesh structure contacts the anode and the cathode.

15. The battery of claim 10, wherein the polymer comprises at least one of poly(propylene oxide) (PPO), poly(ethylene oxide) (PEO), poly(acrylonitrile) (PAN), poly(vinylidene fluoride) (PVDF), or poly(methyl methacrylate) (PMMA).

16. The battery of claim 10, wherein the electrolyte comprises a solid-state ion conducting structure.

17. The battery of claim 10, wherein the plurality of boron nitride nanotubes comprises hexagonal boron nitride (h-BN).

18. The battery of claim 10, wherein the electrolyte comprises at least one of germanium-based nanoparticles, cobalt-iron oxide based nanoparticles, or molybdenum-based nanoparticles.

* * * * *